Jan. 6, 1942.     O. SHACKELFORD     2,268,724

TRANSFER DEVICE FOR CONVEYERS

Filed Aug. 16, 1939

Inventor:
Orie Shackelford,
By Cushman Darby & Cushman
Attorneys.

Patented Jan. 6, 1942

2,268,724

UNITED STATES PATENT OFFICE 2,268,724

TRANSFER DEVICE FOR CONVEYERS

Orie Shackelford, Fairmont, W. Va.

Application August 16, 1939, Serial No. 290,484

11 Claims. (Cl. 198—20)

This invention relates to mechanisms for transferring articles from one conveyer to another, and, more particularly, to means for transferring articles of glassware from a lehr stacker to a ware supporting conveyer belt in a glassware annealing lehr.

The present application is a continuation-in-part of my pending application Serial No. 131,215, filed March 16, 1937, now Patent 2,191,591, dated February 27, 1940, and discloses subject matter divisible from said application. The apparatus claimed herein is adapted to effect transfer of articles of glassware from a lehr stacker of the type shown in that application, to an annealing lehr of any preferred type, for instance, to an annealing lehr of the kind shown and claimed in my application Serial No. 131,216, filed March 16, 1937, now Patent 2,197,440, dated April 16, 1940.

It is an object of the invention to provide means for facilitating the transfer of an article from one endless belt conveyer to another. To this end, the invention contemplates a transfer plate, or other device, spanning the space between the two conveyer belts, where the belts are trained about their guide rollers at adjacent ends.

It is a further object of the invention to provide novel means for assuring that the articles, when moved upon the transfer plate at the discharge end of one conveyer, shall move across the plate onto the infeed end of the next conveyer and shall not remain at rest on the transfer plate. Of course, if the articles are of sufficient size to project beyond the front and rear edges of the transfer plate a substantial distance, the two conveyers will move the articles thereacross, but, if the bottoms of the articles are of substantially the same size as the width of the transfer plate, means must be provided for moving them across the plate while they are out of contact with the moving conveyer belts.

It is a further object of the invention to provide means for vibrating a transfer plate so as to cause articles supported thereon to move thereacross. To accomplish this object, in the specific embodiment illustrated, the supporting means for the transfer plate are provided with elements engaging a surface of one of the conveyer belts, so that, as the belt moves, the supports and the plate are vibrated, continuously and automatically.

It is a further object of the invention to provide a plurality of transfer plates of the character described and to provide means for causing the several plates to vibrate substantially in unison.

Other objects and advantages of the invention will be apparent from a consideration of the following description of a specific embodiment of the invention, illustrated in the accompanying drawing, in which.

Figure 1:
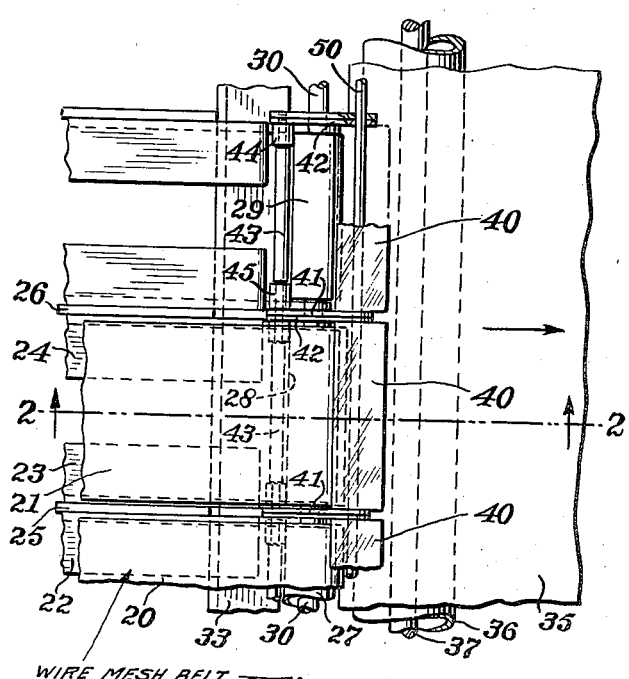
Figure 1 is a plan view of the mechanism with certain parts broken away.
Figure 3:
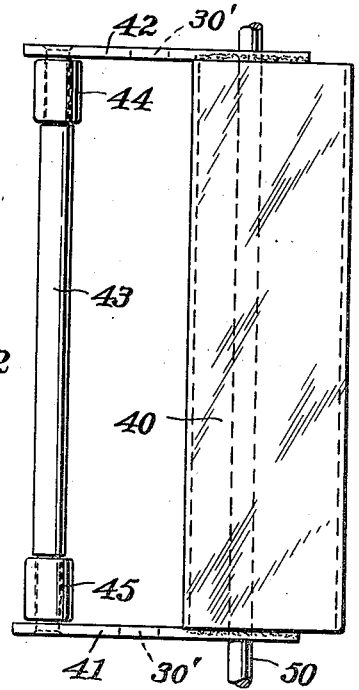
Figure 3 is a plan view of one transfer plate, removed from the conveying mechanism.

At the left of Figure 1, the discharge end of a lehr stacker of the type shown in my pending application Serial No. 131,215 is shown. The stacker comprises a plurality of relatively narrow, elongated, endless wire mesh conveyer belts 20, 21, supported upon angle bars 22, 23, 24, bolted or otherwise secured to vertically disposed supporting plates or beams 25, 26. The conveyer belts 20, etc., are trained about rollers 27, 28, 29, journalled on or rotatable with a shaft 30 supported by the vertical plates 25, 26. A lower roller 31 (Fig. 2) is similarly mounted on shaft 32 carried by a cross bar 33, as is fully explained in the aforesaid application. The stacker is positioned adjacent the entrance end of a lehr having a relatively wide, elongated, endless wire mesh belt 35 therein, trained about a roller 36 journalled or otherwise supported on a shaft 37, disposed in parallel relation to the shaft 30. For a more complete disclosure of a suitable lehr and the like, reference is made to my Patent 2,197,440.

Figure 2:
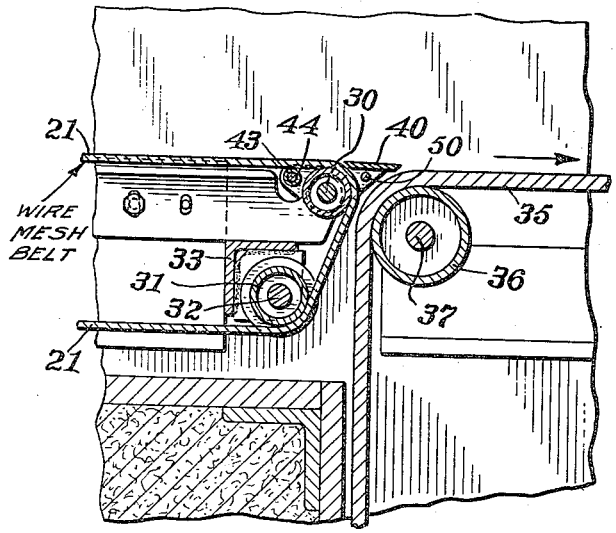
Figure 2 is a longitudinal vertical section taken on line 2—2 of Figure 1.
Figure 4:
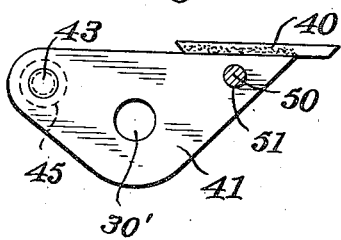
Figure 4 is an end elevation of the device of Figure 3.

The present invention relates to means for transferring articles across the space between the adjacent aligned ends of the stacker conveyers and the lehr conveyer, where they are trained about their respective guide rollers. Aligned with each conveyer 20, 21, is a transfer plate 40, substantially spanning the space between that conveyer and the lehr conveyer, as shown in Figure 2. Each plate 40 is supported upon vertically disposed plates or flanges 41, 42, at its opposite ends. The transfer plates and the supporting plates may be formed integrally or they may be secured together by welding, brazing or the like. The supporting plates 41, 42 are provided with apertures 30' through which the transverse shaft 30 projects. Hence, the supporting plates and the transfer plates are pivotally mounted for movement about the axis of the shaft 30. At their rear ends, the supporting plates 41 are connected by a transverse rod 43 having rollers 44, 45 journalled thereon. As indicated in Figure 2, the rollers are disposed in contact with the undersurface of the associated stacker belt. Since these belts are preferably of wire mesh fabric having pronounced roughened surfaces, as the belts move, and as the projections thereon pass over the rollers 44, 45, the rod 43, the supporting plates 41 and the transfer plates 40 will be vibrated.

When assembled, the plates 40 are slightly inclined downwardly from the stacker belt toward the lehr belt. The weight of the articles on the transfer plates may tend to increase the angle of inclination somewhat. Hence, when articles of glassware or the like are moved onto the transfer plates by the stacker conveyers 20, 21, and when the transfer plates are vibrated, the articles will move thereacross, where they will be picked up by the lehr conveyer 35.

In order to increase the rapidity of the vibrations of the several plates, and to cause the plates to vibrate substantially in unison, the several supporting plates 41, 42 of the various transfer units may be interconnected. As shown in the accompanying drawing, the connection between the plates preferably takes the form of a transversely extending rod 50, extending through aligned apertures 51 in the plates. Thus, a projection on any one of the stacker belts passing over any one of the rollers 44, 45 will impart a vibration to the entire series of transfer plates.

It must be understood that the invention is not confined to the specific details of construction shown in the accompanying drawing and described above, but covers all modifications coming within the scope of the appended claims and their equivalents.

I claim:

1. The combination with two longitudinally aligned conveyers comprising belts trained about substantially parallel rollers at the adjacent ends of the conveyers, of means for facilitating the transfer of articles from one conveyer to the other, said means comprising a plate substantially spanning the space between the adjacent ends of the conveyers and supporting means for said plate comprising members pivoted about the axis of one of said rollers, and means for imparting oscillations in a vertical plane to said members to vibrate the plate.

2. The combination with two conveyers having their ends in spaced relation, of means for transferring articles from one conveyer to the other, one of said conveyers having a rough surface, said means comprising a plate substantially spanning the space between the ends of the conveyers, supporting means for said plate pivoted for oscillation in a vertical plane and an element carried by said supporting means and disposed in engagement with said rough face of said conveyer, whereby movement of the conveyer imparts vertical oscillations to the supporting means and the plate.

3. The combination with two longitudinally aligned conveyers trained about substantially parallel rollers at their adjacent ends, of means for facilitating the transfer of articles from one conveyer to the other, one of said conveyers having rough surfaces, said means comprising a plate substantially spanning the space between the adjacent ends of the conveyers, supporting means for said plate comprising members pivoted about the axis of one of said rollers, and an element carried by the members and disposed in engagement with one of the rough faces of said one conveyer and positioned to be actuated thereby, to vibrate the plate in a vertical plane.

4. The combination with a plurality of parallel, wire mesh conveyor belts having rough surfaces and a relatively wide conveyer belt longitudinally aligned therewith, with its receiving end adjacent the discharge end of the parallel belts, of means for facilitating the transfer of articles from the parallel belts to the last-mentioned belt, said means comprising plate means substantially spanning the space between the adjacent ends of the conveyer belts, pivotally mounted supporting means for the plate means, and means carried by the supporting means and disposed in engagement with the rough surfaces of said parallel belts for vibrating the supporting means and plate means.

5. The combination with a plurality of endless parallel, wire mesh conveyer belts having upper and lower runs and a relatively wide endless belt longitudinally aligned therewith, with its receiving end adjacent the discharge ends of the upper runs of the parallel belts, of means for facilitating the transfer of articles from the parallel belts to the wide belt, said means comprising plate means substantially spanning the space between the adjacent ends of the belts, pivotally mounted supporting means for the plate means, and rollers carried by the supporting means disposed in engagement with the undersurfaces of the upper runs of the parallel belts and arranged to transmit vibration from the belts to the plate means.

6. Mechanism for transferring articles from the ends of a set of parallel wire mesh conveyers of to the adjacent end of another conveyer longitudinally aligned therewith, said mechanism comprising a plurality of plates arranged transversely of the conveyers and spanning the space between the adjacent ends thereof, supports for the plates extending downwardly between the longitudinal side edges of the parallel conveyers, and elements carried by said supports and disposed in engagement with the undersurfaces of the parallel conveyers, whereby movement of the latter imparts vibrations to the supports and the plates.

7. Mechanism for transferring articles from the ends of a set of parallel wire mesh conveyers to the adjacent end of another conveyer longitudinally aligned therewith, said mechanism comprising a plurality of plates arranged transversely of the conveyers and spanning the space between the adjacent ends thereof, supports for the plates extending downwardly between the longitudinal sides edges of the parallel conveyers, elements carried by certain of said supports and disposed in engagement with the undersurfaces of the adjacent wire mesh conveyers, whereby movement thereof imparts vibrations to the supports, and means interconnecting all of said plates to cause the plates to vibrate substantially in unison.

8. In conveying apparatus of the type wherein two endless, wire mesh belt conveyers are trained about spaced rollers on transversely arranged parallel shafts, mechanism for transferring articles from one conveyer to the other, comprising a plate spanning the space between the belts on the rollers, supports for the plate extending downwardly adjacent the side edges of one of the conveyers and pivoted on the shaft carrying the roller for that conveyer, and means carried by the supports engaging a surface of the last-mentioned conveyer and receiving motion therefrom to vibrate the plate.

9. In conveying apparatus of the type wherein two endless belt conveyers are trained about spaced rollers on transversely arranged parallel shafts, one of said conveyers being of wire mesh material and having rough surfaces, mechanism for transferring articles from one conveyer to the other comprising a plurality of aligned plates disposed in parallel relation to said shafts and spanning the space between the belts on the rollers, supporting means for the plates pivotally mounted on one of said shafts, means carried by said supporting means disposed in engagement with one surface of said wire mesh conveyer and adapted to receive movement therefrom to vibrate the associated plate, and means interconnecting the plates to cause the same to vibrate substantially in unison.

10. In conveying apparatus of the type wherein a plurality of relatively narrow, wire mesh, endless belt conveyers and a relatively wide endless belt conveyer are trained about spaced rollers on transversely arranged parallel shafts, mechanism for transferring articles from the narrow conveyers to the wide conveyer, comprising a plurality of plates spanning the space between the belts on the rollers, supports for the plates extending downwardly between the parallel conveyers and pivoted on one of the shafts, and means carried by the supports engaging the undersurfaces of the wire mesh belts and receiving motion therefrom to vibrate the plates.

11. In conveying apparatus of the type wherein a plurality of relatively narrow, wire mesh, endless belt conveyers and a relatively wide endless belt conveyer are trained about spaced rollers on transversely arranged parallel shafts, mechanism for transferring articles from the narrow conveyers to the wide conveyer, comprising a plurality of plates spanning the space between the belts on the rollers, supports for the plates extending downwardly between the parallel conveyers and pivoted on the adjacent shaft, means carried by certain of the supports engaging the undersurface of the adjacent wire mesh belt, whereby movement thereof imparts vibrations to the plates, and a transversely extending rod interconnecting all of said supports whereby the plates vibrate substantially in unison.

ORIE SHACKELFORD.